US012129836B2

(12) United States Patent
Van Oort et al.

(10) Patent No.: US 12,129,836 B2
(45) Date of Patent: Oct. 29, 2024

(54) GEOTHERMAL WELL DESIGNS AND CONTROL THEREOF FOR EXTRACTION OF SUBSURFACE GEOTHERMAL POWER

(71) Applicant: Board of Regents, The University of Texas System, Austin, TX (US)

(72) Inventors: Eric Van Oort, Austin, TX (US); Pradeepkumar Ashok, Austin, TX (US); Dongmei Chen, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 18/247,767

(22) PCT Filed: Oct. 6, 2021

(86) PCT No.: PCT/US2021/053817
§ 371 (c)(1),
(2) Date: Apr. 4, 2023

(87) PCT Pub. No.: WO2022/076594
PCT Pub. Date: Apr. 14, 2022

(65) Prior Publication Data
US 2023/0374976 A1 Nov. 23, 2023

Related U.S. Application Data

(60) Provisional application No. 63/088,771, filed on Oct. 7, 2020.

(51) Int. Cl.
*F03G 4/00* (2006.01)
*F24T 10/00* (2018.01)
*F24T 10/20* (2018.01)

(52) U.S. Cl.
CPC .............. *F03G 4/029* (2021.08); *F24T 10/20* (2018.05); *F24T 2010/56* (2018.05)

(58) Field of Classification Search
CPC ........ F03G 4/029; F24T 10/20; F24T 2010/56
(Continued)

(56) References Cited

U.S. PATENT DOCUMENTS 6,301,894 B1 10/2001 Halff
6,668,554 B1 12/2003 Brown
(Continued)

FOREIGN PATENT DOCUMENTS

CH 703613 A1 2/2012

OTHER PUBLICATIONS

International Search Report and Written Opinion in related application PCT/US2021/053817 dated Jan. 18, 2022.
(Continued)

*Primary Examiner* — Hoang M Nguyen
(74) *Attorney, Agent, or Firm* — Patterson + Sheridan, LLP

(57) ABSTRACT

A geothermal well includes a borehole formed in a geologic formation. The borehole includes a first portion extending from a first end to a second end and a second portion intersecting the first portion at a first depth. The second portion is exposed to the formation for heating a fluid flowing in the second portion. The well includes an outer string disposed in the first portion where a lower end of the outer string is disposed above the first depth. The well includes an inner string disposed though the outer string and an annulus formed between the inner string and the outer string. The well includes a choke fluidly coupled to at least one of the annulus or the inner string. The choke is configured to regulate return flow of the heated fluid to maintain surface backpressure above a boiling pressure of the heated fluid at surface.

20 Claims, 8 Drawing Sheets

(58) Field of Classification Search
USPC .............................................. 60/641.2–641.4
See application file for complete search history.

(56) References Cited

U.S. PATENT DOCUMENTS

| | | | |
|---|---|---|---|
| 7,251,938 | B1 | 8/2007 | Bond |
| 2007/0163805 | A1 | 7/2007 | Trevisani |
| 2007/0245729 | A1 | 10/2007 | Mickleson |
| 2010/0276143 | A1* | 11/2010 | Vestavik ................. E21B 21/12 166/373 |
| 2011/0048005 | A1 | 3/2011 | McHargue |
| 2012/0174581 | A1 | 7/2012 | Vaughan et al. |
| 2012/0312545 | A1 | 12/2012 | Suryanarayana et al. |
| 2013/0152578 | A1 | 6/2013 | Solem |
| 2013/0232973 | A1 | 9/2013 | McBay |
| 2016/0245550 | A1 | 8/2016 | Sønju et al. |
| 2017/0211849 | A1 | 7/2017 | Muir et al. |
| 2020/0347707 | A1* | 11/2020 | Bowdon ............... E21B 43/122 |
| 2021/0003320 | A1* | 1/2021 | Toews ................... E21B 43/305 |
| 2021/0356174 | A1* | 11/2021 | Alharbi ................. E21B 43/129 |
| 2022/0316287 | A1* | 10/2022 | Yoshioka .............. E21B 21/003 |

OTHER PUBLICATIONS

Amaya, et al.; 2020. GreenFire Energy Closed-Loop Geothermal Demonstration using Supercritical Carbon Dioxide as Working Fluid, in: 45th Workshop on Geothermal Reservoir Engineering. pp. 1-19.

Schulz, S. U.; 2008. Investigations on the improvement of the energy output of a closed loop geothermal system (CLGS). Technische Universität Berlin.

Song, et al.; 2018. Numerical analysis of the heat production performance of a closed loop geothermal system. Renew. Energy 120, 365-378. https://doi.org/10.1016/j.renene.2017.12.065.

Sun, et al.; 2018. Geothermal energy development by circulating CO2 in a U-shaped closed loop geothermal system. Energy Convers. Manag. 174, 971-982. https://doi.org/10.1016/j.enconman.2018.08.094.

Blackwell, et al.; 2011. Temperature-at-depth maps for the conterminous U. S. and geothermal resource estimates. Trans.—Geotherm. Resour. Counc. 35 2, 1545-1550.

Lu, S.M.; 2018. A global review of enhanced geothermal system (EGS). Renew. Sustain. Energy Rev. 81, 2902-2921. https://doi.org/10.1016/j.rser.2017.06.097.

Olasolo, et al.; 2016. Enhanced geothermal systems (EGS): A review. Renew. Sustain. Energy Rev. 56, 133-144. https://doi.org/10.1016/j.rser.2015.11.031.

Pan, et al.; 2019. Establishment of enhanced geothermal energy utilization plans: Barriers and strategies. Renew. Energy 132, 19-32. https://doi.org/10.1016/j.renene.2018.07.126.

Polsky, et al.; 2009. Enhanced geothermal systems well construction technology evaluation. SEG Tech. Progr. Expand. Abstr. 28, 4331-4332. https://doi.org/10.1190/1.3255790.

Rybach, L.; 2010. The Future of Geothermal Energy and Its Challenges. World Geotherm. Congr. 1-4.

Tester, et al.; 2006. The Future of Geothermal Energy. Massachusetts Inst. Technol. 358.

Winsloe, et al.; 2020. The Emerging ( and Proven ) Technologies that Could Finally Make Geothermal Scalable, in: Proceedings World Geothermal Congress. pp. 1-11.

* cited by examiner

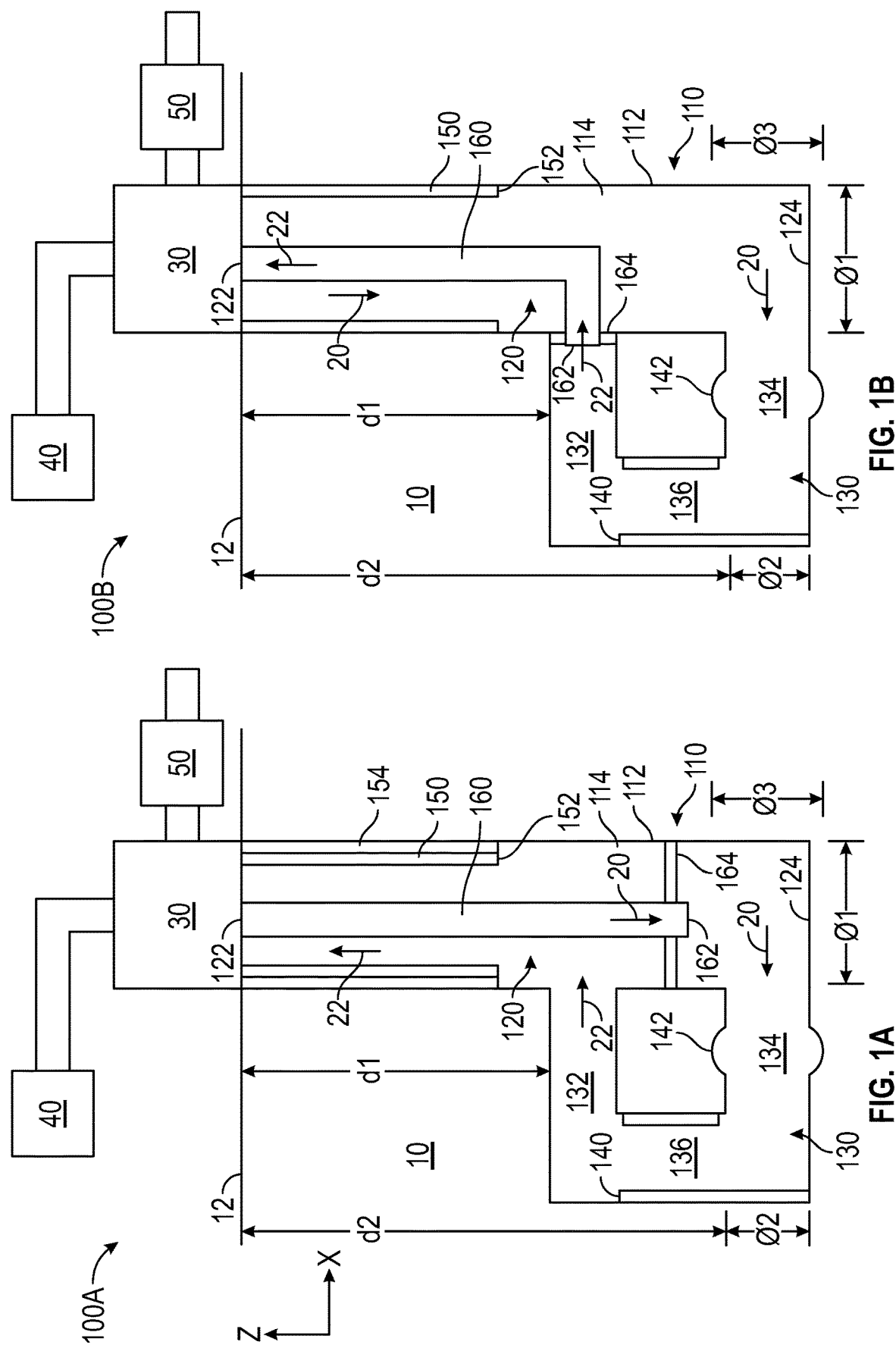

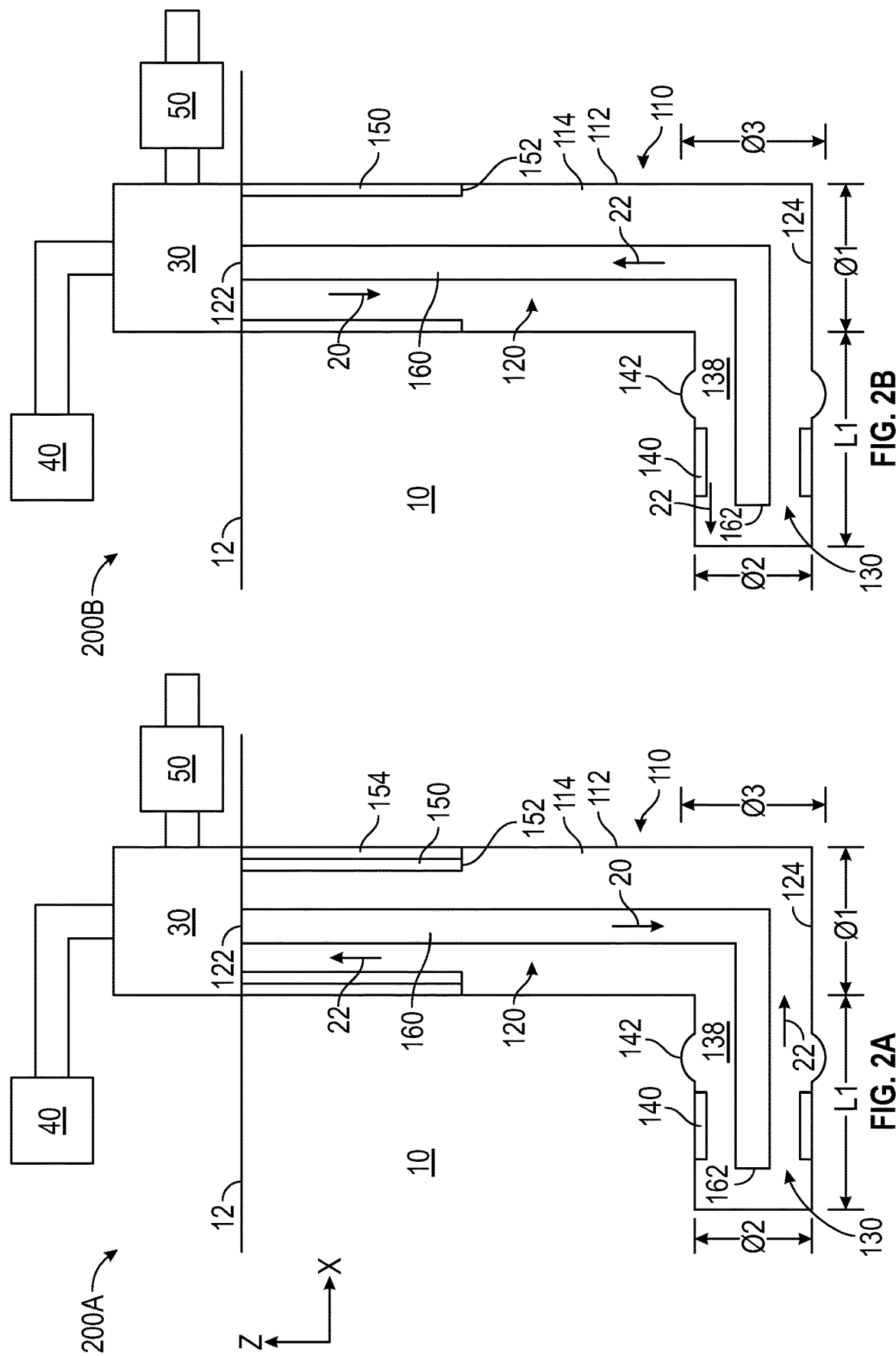

GEOTHERMAL WELL DESIGNS AND CONTROL THEREOF FOR EXTRACTION OF SUBSURFACE GEOTHERMAL POWER

BACKGROUND OF THE DISCLOSURE

Field of the Disclosure

The present disclosure generally relates to extraction of subsurface geothermal power. More particularly, embodiments of the present disclosure relate to geothermal well designs and control thereof.

Description of the Related Art

Geothermal is a clean and renewable energy source. However, the development of geothermal energy has been limited mostly to geological regions having high formation temperature gradients and permeable aquifers since these features have helped make current technology more economically viable. Current techniques remain region-specific, limiting adoption of geothermal technology.

Different practices have been developed in an effort to expand the application of geothermal energy. For example, Enhanced Geothermal Systems (EGSs) have been developed to provide potentially scalable geothermal power. EGS wells rely on the presence of natural fractures or induced fractures by hydraulic stimulation (e.g., hydraulic fracturing), or a combination thereof, in Hot Dry Rock (HDR). During EGS operation, fluid is injected at high pressure into an injection well, the fluid is heated during transport through the fracture network, and heated fluid is recovered through a production well to surface, where the heated fluid is used as an energy source. However, EGS wells remain region-specific and are not suited for many geologic formations. Moreover, EGS wells require fracturing with known detrimental effects of induced seismicity, fluid contamination by formation gases and solutes, and fracture bypassing which reduces heating efficiency. Often, fractures are blocked by mineral deposition leaving most of the network unavailable, resulting in non-dispersed flow through a small number of fractures, and requiring high fluid pressures to force fluid through the open network, thereby reducing overall efficiency of the system, increasing formation stress, and exacerbating seismicity concerns. In summary, EGS suffers from undesirable emissions to air, block off of the fracture network, induced seismicity, and high levels of fluid use.

Therefore, there is a need for alternatives to EGS such as improved closed loop well designs and control for extraction of subsurface geothermal power.

SUMMARY OF THE DISCLOSURE

In one embodiment, a geothermal well includes a borehole formed in a geologic formation, the borehole including a first portion extending from a first end to a second end and a second portion intersecting the first portion at a first depth, where the second portion is exposed to the formation for heating a fluid flowing in the second portion. The geothermal well includes an outer string disposed in the first portion, a lower end of the outer string being disposed above the first depth. The geothermal well includes an inner string disposed through the outer string and an annulus formed between the inner string and the outer string. The geothermal well includes a choke fluidly coupled to at least one of the annulus or the inner string, where the choke is configured to regulate return flow of the heated fluid to maintain surface backpressure above a boiling pressure of the heated fluid at surface.

In another embodiment, a method of drilling a geothermal well includes drilling a first portion of a borehole in a geologic formation and drilling a second portion of the borehole where the second portion is exposed to the formation for heating a fluid flowing in the second portion. The drilling of the second portion includes drilling a first deviated section intersecting the first portion at a first depth and drilling a second deviated section intersecting the first portion at a second depth greater than the first depth. The method includes installing an inner string in the first portion.

In another embodiment, a method of operating a geothermal well includes flowing a fluid through a first portion of a borehole formed in a geologic formation, where the first portion includes an inner string, an outer string, and an annulus formed between the inner and outer strings. The method includes flowing the fluid through a second portion of the borehole intersecting the first portion, where the second portion is exposed to the formation for heating the fluid flowing in the second portion. The method includes applying a surface backpressure to the borehole by regulating return flow of the heated fluid using a choke, the choke being fluidly coupled to at least one of the annulus or the inner string, where the surface backpressure is maintained above a boiling pressure of the heated fluid at surface.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1A is a schematic diagram of an external closed loop geothermal well with conventional circulation, according to one or more embodiments of the present disclosure.

FIG. 1B is a schematic diagram of another external closed loop geothermal well with reverse circulation, according to one or more embodiments of the present disclosure.

FIG. 2A is a schematic diagram of an internal closed loop geothermal well with conventional circulation, according to one or more embodiments of the present disclosure.

FIG. 2B is a schematic diagram of an internal closed loop geothermal well with reverse circulation, according to one or more embodiments of the present disclosure.

DETAILED DESCRIPTION

Figure 3A:
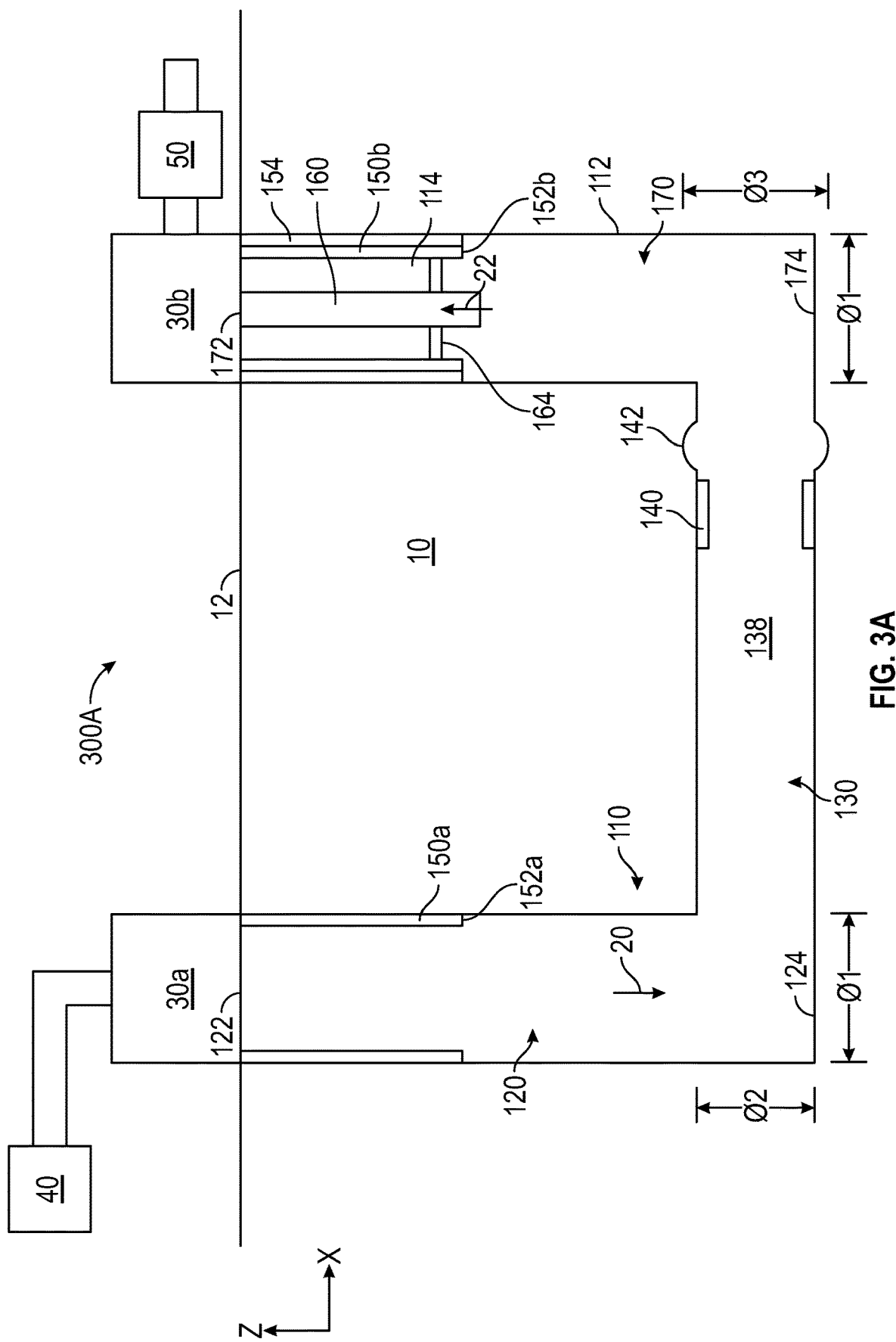
FIG. 3A is a schematic diagram of a U-shaped geothermal well, according to one or more embodiments of the present disclosure.

The present disclosure generally relates to extraction of subsurface geothermal power. More particularly, embodiments of the present disclosure relate to geothermal well designs and control thereof. Embodiments of the present disclosure relate to a geothermal well including closed loop well designs and control for extraction of subsurface geothermal power.

Herein, extraction of subsurface geothermal power refers to a process that generally includes injecting a fluid into a well, heating the fluid as the fluid flows through the well, and using the heated fluid directly or routing the heated fluid through steam turbines at surface to convert steam pressure and temperature into electricity. In certain embodiments, the heat energy is temporarily stored and subsequently used to power the steam turbines.

FIG. 1A is a schematic diagram of an exemplary external closed loop geothermal well 100A with conventional circulation. FIG. 1B is a schematic diagram of another exemplary external closed loop geothermal well 100B with reverse circulation.

The external closed loop geothermal wells 100A, 100B include a borehole 110 formed in a geologic formation 10, where a borehole wall 112 is formed at the interface of the borehole 110 and the formation 10. An annulus 114 is formed between the borehole wall 112 and one or more tubulars disposed in the borehole 110. The borehole 110 includes a first portion 120 extending from a first end 122 located proximate a surface 12 of the formation 10 to a second end 124 located distally opposite the first end 122. In some embodiments, the first portion 120 of the borehole 110 is drilled to a true vertical depth (TVD) of about 5 km or greater. The borehole 110 includes a second portion 130. The second portion 130 forms an external closed loop in the formation 10 such that the second portion 130 intersects the first portion 120 at a first depth d1 and at a second depth d2. The first depth d1 is located between the first and second ends 122, 124 of the first portion 120. The second depth d2 is greater than the first depth d1 such that the second depth d2 is located between the first depth d1 and the second end 124 of the first portion 120. In one or more embodiments, a diameter ø1 of the first portion 120 measured below the first depth d1 and at or above the second depth d2 is about 8 inches or greater, such as from about 5 inches to about 20 inches, such as from about 6 inches to about 15 inches, such as from about 8 inches to about 15 inches.

The second portion 130 includes a first deviated section 132 intersecting the first portion 120 at the first depth d1, a second deviated section 134 intersecting the first portion 120 at the second depth d2, and an optional third section 136 fluidly coupling the first and second deviated sections 132, 134. In some embodiments, the first and second deviated sections 132, 134 directly intersect each other without the third section 136. Here, the first and second deviated sections 132, 134 are oriented substantially along the x-y plane. In some other embodiments, the first and second deviated sections 132, 134 are oriented out of plane from the x-y plane. In some embodiments, the first and second deviated sections 132, 134 are separate J-shaped wells that intersect at their respective bottom tips. In the embodiments shown in FIGS. 1A and 1B, the borehole 110 is illustrated schematically such that the first and second deviated sections 132, 134 intersect the first portion 120. However, it will be appreciated that in practice the first and second deviated sections 132, 134 each include a build section transitioning from the first portion 120 to the respective first and second deviated sections 132, 134. It will be further appreciated that a length and build rate of the build section is constrained by available directional drilling technologies including technologies that may be developed after filing of the present application. For example, current build rates are limited to about 20° per 100 feet, but further increases are expected over time. In some embodiments, the shape of the second portion 130 is limited only by whether the second portion 130 is drillable. Here, the third section 136 is oriented substantially along the z-axis. In some other embodiments, the third section 136 is oriented off-axis from the z-axis. Here, the first portion 120 is substantially vertical such that the first and second deviated sections 132, 134 are vertically spaced and the second portion 130 is oriented substantially in the x/y-z plane. In some other embodiments, the first portion 120 is substantially horizontal below the first depth d1, such that the first and second deviated sections 132, 134 are horizontally spaced and the second portion 130 is oriented substantially in the x-y plane.

In some embodiments, a total length of the second portion 130, including the respective build sections, is about 3 km or greater, such as about 5 km or greater, such as about 7 km or greater, such as about 10 km or greater, alternatively from about 3 km to about 15 km, such as from about 3 km to about 10 km, such as from about 5 km to about 10 km, such as from about 7 km to about 10 km. In some embodiments, a diameter ø2 of the second portion 130 is less than or about equal to the diameter ø1 of the first portion 120. In some embodiments, the diameter ø2 of the second portion 130 is from about 5 inches to about 20 inches, such as from about 6 inches to about 15 inches, such as from about 8 inches to about 15 inches. In some embodiments, a total heat exchanging surface area of the second portion 130 is about 2,000 m$^2$ or greater, such as about 5,000 m$^2$ or greater, such as about 10,000 m$^2$ or greater, alternatively from about 2,000 m$^2$ to about 15,000 m$^2$, such as from about 5,000 m$^2$ to about 15,000 m$^2$, such as from about 10,000 m$^2$ to about 15,000 m$^2$.

The second portion 130 is exposed to the formation 10 (i.e., open-hole) for heating a fluid 20 disposed in the second portion 130. In other words, the second portion 130 is configured to allow direct contact between the fluid 20 and the formation 10 as the fluid 20 is conveyed through the second portion 130. In some embodiments, a temperature of the formation 10 in contact with the second portion 130 is about 200° C. or greater. In such embodiments, power produced by the external closed loop geothermal wells 100A, 100B can exceed 10 MW. In some embodiments, the fluid 20 includes water, brine, super-critical $CO_2$, one or more fluoroorganics, other similar fluids, other fluids having relatively high heat capacity, conductivity, or both, or combinations thereof.

In some embodiments, the borehole wall 112 of the second portion 130 is at least partially coated with a coating material 140. In some embodiments, the coating material 140 is configured to disrupt hydraulic transport, diffusive transport, osmotic transport, or combinations thereof, from the borehole 110 to the formation 10, from the formation 10 to the borehole 110, or both. In some other embodiments, the coating material 140 is configured to disrupt pressure diffusion from the fluid 20/22 to the formation 10, reduce fluid invasion from the borehole 110 to the formation 10, inhibit chemical transport between the fluid 20/22 and the formation 10, or combinations thereof. In some embodiments, the coating material 140 can be or include one or more silicates (e.g., $SiO_2$), aluminates, resins, other formation plugging materials, or combinations thereof. In some embodiments, the second portion 130 is at least partially enlarged during drilling, during operation, or both, thereby forming a cavity 142 having a diameter ø3. In some embodiments, the cavity 142 increases residence time of the fluid 20 flowing in the borehole 110. In some embodiments, the cavity 142 is formed by a destabilizing pressure less than fracture pressure. In some other embodiments, the cavity 142 is formed by underreaming. In some embodiments, the second portion 130 extends through a salt formation or other formation types having naturally-occurring cavities. In some embodiments, the diameter ø3 of the cavity 142 is greater than or about equal to the diameter ø1 of the first portion 120. In some embodiments, the diameter ø3 of the cavity 142 is from about 5 inches to about 20 inches, such as from about 6 inches to about 15 inches, such as from about 8 inches to about 15 inches.

An outer tubing string 150 is disposed adjacent the borehole wall 112 in the first portion 120 of the borehole 110. A lower end 152 of the outer string 150 is disposed above the first depth d1. Here, the outer string 150 does not extend along a total length of the well 100A, B, e.g., to the second portion 130 thereof, such that the second portion 130 is an open-hole, e.g., barefoot, completion. In some embodiments, the open-hole completion enables direct contact between the fluid 20 and the formation 10, direct contact being most effective for heat transfer. In some embodiments, the open-hole completion facilitates re-drilling a portion of the well should heat extraction become non-viable, when the portion is destabilized, or both. However, the well 100A, B is not particularly limited to the illustrated embodiment. For example, in some other embodiments, the outer string 150 extends substantially along the total length of the well 100A, B, e.g., including the second portion 130 thereof, such that the second portion 130 is a cased-holed completion. In some embodiments, the cased-hole completion stabilizes the well 100A, B. In some embodiments, the outer string 150 includes one or more casing strings coupled to a wellhead 30 at the surface 12 of the formation 10. In some embodiments, the outer string 150 includes 7 inch casing, 9⅝ inch casing, 13⅜ inch casing, or combinations thereof. In some other embodiments, the outer string 150 further includes a liner suspended from an inner casing string of the one or more casing strings. In some embodiments, the outer string 150 is partially or fully thermally insulated. In some embodiments, thermal insulation 154 is disposed between the outer string 150 and the borehole wall 112.

In some embodiments, the thermal insulation 154 is integral with the outer string 150. In such embodiments, the outer string 150 can include one or more joints of vacuum insulated tubing (VIT) where the thermal insulation 154 can be or include a shield of foil and basalt fiber fabric installed in an annular space of a concentric casing or liner with the annular space being under vacuum. In some other embodiments, the thermal insulation 154 is attached to the outer string 150 before the outer string 150 is installed in the borehole 112. In such embodiments, the thermal insulation 154 can be or include a thermally-insulating coating applied to a surface of the outer string 150.

In some other embodiments, the thermal insulation 154 can be or include an insulated cement disposed between the outer string 150 and the borehole 112 during a cementing operation. In such embodiments, the insulated cement includes one or more additives (e.g., Halloysite nanotubes, aluminosilicates) for lowering the thermal conductivity of the base cement. In some other embodiments, the thermal insulation 154 includes foamed cement. In some embodiments, the thermal insulation 154 reduces heat loss from a heated fluid 22 to the formation 10 as the heated fluid 22 is conveyed through the first portion 120 of the borehole 110. In one or more embodiments, the thermal insulation 154 increases steady state temperature of the heated fluid 22 by about 50° C. or more and increases thermal power generation by about 20% or more by reducing heat loss to the formation 10.

An inner tubing string 160 is disposed through the outer string 150 defining the annulus 114 therebetween. In some embodiments, the inner string 160 includes a plurality of threaded pipe joints extending from the wellhead 30 at the surface 12. In some other embodiments, the inner string 160 is a coiled tubing string. In some embodiments, an inner diameter of the inner string 160 is about 5 inches or greater, such as from about 5 inches to about 10 inches. In some embodiments, the inner string 160 includes one or more joints of VIT such that the inner string 160 is thermally insulated. In such embodiments, the inner string 160 reduces heat loss from the heated fluid 22 to the annulus 114 as the heated fluid 22 is conveyed through the inner string 160. A seal 164, such as a packer, is disposed at or near a distal end of the inner string 160 to form a sealing engagement between the inner string 160 and the borehole wall 112. In some embodiments, the seal 164 is a packer, or other similar device.

Referring to FIG. 1A, the external closed loop geothermal well 100A is configured for conventional circulation. In this example, a lower end 162 of the inner string 160 is disposed below the first depth d1. The seal 164 isolates the annulus 114 above the lower end 162 of the inner string 160 from the first portion 120 of the borehole 110 below the lower end 162. In operation, the fluid 20 is pumped down the borehole 110 through the inner string 160 by a fluid pump 40 located at surface 12. In some embodiments, a flow rate of the fluid 20 is about 1,000 gal/min or greater, such as from about 1,000 gal/min to about 5,000 gal/min. The fluid 20 exits the lower end 162 of the inner string 160 below the first depth d1. The seal 164 prevents the exiting fluid 20 from flowing up the annulus 114 and forces the fluid 20 to continue flowing downstream toward the second deviated section 134. The fluid 20 enters the second deviated section 134 of the second portion 130 at the second depth d2. The fluid 20 flows sequentially through the second deviated section 134, the third section 136, and the first deviated section 132. The fluid 20 is heated by thermal conduction, convection, and/or radiation from the formation 10 as the fluid 20 is conveyed through the second portion 130. The heated fluid 22 re-enters the first portion 120 of the borehole 110 at the first depth d1 where the first deviated section 132 of the second portion 130 intersects the first portion 120. The heated fluid 22 flows to surface 12 through the annulus 114 between the outer and inner strings 150, 160. In some embodiments, additional heating occurs as the heated fluid 22 is returned to surface 12 along the first portion 120 of the borehole 110.

The choke 50 is fluidly coupled to the annulus 114. In one or more embodiments, the choke 50 regulates return flow of the heated fluid 22 in order to apply surface backpressure (SBP) to the well 100A. It will be appreciated that SBP control is similar to managed pressure control, and the terms may be used interchangeably herein. In some embodiments, SBP enables precise control of the phase-dynamics of the heated fluid 22, e.g., to prevent formation of steam. In some embodiments, SBP mechanically stabilizes the open-hole. In some embodiments, the choke 50 is controlled manually. In some other embodiments, the choke 50 is controlled using an automated control system such as by using a Proportional Integral (PI) controller, a Linear Quadratic Regulator, or an Adaptive Controller. In some embodiments, the choke 50 is controlled to maintain SBP greater than the boiling pressure of the heated fluid 22 at surface 12. In some embodiments, the SBP is about 5000 psi or less, such as about 2000 psi or less. In some embodiments, a safety margin between the SBP and the boiling pressure is about 100 kPa or greater, such as from about 100 kPa to about 2 MPa, alternatively about 500 kPa or greater, such as from about 500 kPa to about 2 MPa. The technique of applying SBP via the choke 50 described herein has one or more of the following advantages compared to conventional operations where return flow is open to atmospheric pressure: improving control of bottom hole pressure (BHP) by preventing steam formation, preventing rapid influx of any reservoir fluids or gas in permeable rock formations by maintaining adequate BHP, improving wellbore integrity by maintaining adequate BHP, removing risk of steam expansion at surface by maintaining adequate SBP.

Some conventional operations use a thermosiphon effect where fluid circulation occurs without a pump due to heated fluid at greater downhole depth being exchanged with colder fluid at a lower depth. However, the thermosiphon effect reduces BHP which can destabilize the borehole especially in deeper wells. Embodiments of the present application can overcome issues associated with conventional operations by applying BHP control.

Referring to FIG. 1B, the external closed loop geothermal well 100B is configured for reverse circulation. In this example, the thermal insulation 154 around the outer string 150 may be omitted because the heated fluid 22 is returned through the inner string 160 instead of being returned through the annulus 114 as described with respect to the embodiment of FIG. 1A. In this example, the lower end 162 of the inner string 160 is continuous with the first deviated section 132 of the second portion 130 at the first depth d1. The seal 164 isolates the first deviated section 132 from the annulus 114. In operation, the fluid 20 is pumped down the borehole 110 through the annulus 114 between the outer and inner strings 150, 160 by the fluid pump 40 located at surface 12. In some embodiments, pre-heating occurs as the fluid 20 is conveyed down the annulus 114. The fluid 20 enters the second deviated section 134 of the second portion 130 at the second depth d2. The fluid 20 flows sequentially through the second deviated section 134, the third section 136, and the first deviated section 132. The fluid 20 is heated by thermal conduction, convection, and/or radiation from the formation 10 as the fluid 20 is conveyed through the second portion 130. The heated fluid 22 re-enters the first portion 120 of the borehole 110 at the first depth d1 through the lower end 162 of the inner string 160 where the inner string 160 is continuous with the first deviated section 132. In this example, the heated fluid 22 flows to surface 12 through the inner string 160. The choke 50 is fluidly coupled to the inner string 160 for regulating return flow of the heated fluid 22 in order to apply backpressure to the well 100B.

FIG. 2A is a schematic diagram of an exemplary internal closed loop geothermal well 200A with conventional circulation. The second portion 130 includes a deviated section 138 intersecting the first portion 120 at or near the second end 124. In some embodiments, a total length L1 of the deviated section 138, including the respective build section, is about 3 km or greater, such as about 5 km or greater, such as about 7 km or greater, such as about 10 km or greater, alternatively from about 3 km to about 15 km, such as from about 3 km to about 10 km, such as from about 5 km to about 10 km, such as from about 7 km to about 10 km. Here, the deviated section 138 is oriented substantially along the x-axis. In some other embodiments, the deviated section 138 is oriented off-axis from the x-axis. The lower end 152 of the outer string 150 is disposed above the second end 124 of the first portion 120 such that the deviated section 138 is an open-hole section. The lower end 162 of the inner string 160 is disposed within the deviated section 138 of the second portion 130. In operation, the fluid 20 is pumped down the borehole 110 through the inner string 160 by the fluid pump 40 located at surface 12. The fluid 20 exits the lower end 162 of the inner string 160 into the deviated section 138. The fluid 20 is heated by thermal conduction, convection, and/or radiation from the formation 10 as the fluid 20 is conveyed through the deviated section 138. The heated fluid 22 re-enters the first portion 120 of the borehole 110 and flows to surface 12 through the annulus 114 between the outer and inner strings 150, 160. In some embodiments, additional heating occurs as the heated fluid 22 is returned to surface 12 along the first portion 120 of the borehole 110. The choke 50 is fluidly coupled to the annulus 114 for regulating return flow of the heated fluid 22 in order to apply backpressure to the well 200A.

FIG. 2B is a schematic diagram of the exemplary internal closed loop geothermal well 200B with reverse circulation. Here, the thermal insulation 154 around the outer string 150 is omitted, that is because the heated fluid 22 is returned through the inner string 160 instead of being returned through the annulus 114 as described with respect to the embodiment of FIG. 2A. In operation, the fluid 20 is pumped down the borehole 110 through the annulus 114 between the outer and inner strings 150, 160 by the fluid pump 40 located at surface 12. In some embodiments, pre-heating occurs as the fluid 20 is conveyed down the annulus 114. The fluid 20 enters the deviated section 138 of the second portion 130 at or near the second end 124. The fluid 20 is heated by thermal conduction, convection, and/or radiation from the formation 10 as the fluid 20 is conveyed through the deviated section 138. The heated fluid 22 enters the inner string 160 through the lower end 162. The heated fluid 22 flows to surface 12 through the inner string 160. The choke 50 is fluidly coupled to the inner string 160 for regulating return flow of the heated fluid 22 in order to apply backpressure to the well 200B.

FIG. 3A is a schematic diagram of an exemplary U-shaped geothermal well 300A. The U-shaped geothermal well 300A includes the first portion 120, the second portion 130, and a third portion 170. In some embodiments, each of the first, second, and third portions 120, 130, 170 independently has a length of about 3 km or greater, such as about 5 km or greater, such as about 7 km or greater, such as about 10 km or greater, alternatively from about 3 km to about 15 km, such as from about 3 km to about 12 km, such as from about 5 km to about 12 km, such as from about 7 km to about 12 km, such as about 10 km to about 12 km. In one exemplary embodiment, the first and third portions 120, 170 each have a length of about 10 km, the second portion 130 has a length of about 5 km, a build radius is about 200 m, and a hole size is from about 4 inches to about 15 inches, such as about 8.5 inches. The first portion 120 includes an outer string 150a disposed adjacent the borehole wall 112 having a lower end 152a. Here, the thermal insulation 154 around the outer string 150*a* is omitted, that is because the heated fluid 22 is returned through the third portion 170 instead of being returned through the first portion 120 as described with respect to the embodiments of FIGS. 1A and 2A. Here, the inner string 160 is omitted from the first portion 120, such that the fluid 20 in the first portion 120 flows through an entirety of the outer string 150*a*. The third portion 170 extends from a first end 172 located proximate the surface 12 to a second end 174 located distally opposite the first end 172. The third portion 170 includes an outer string 150*b* disposed adjacent the borehole wall 112 and having a lower end 152*b*. The third portion 170 further includes the inner string 160 disposed through the outer string 150*b* defining the annulus 114 therebetween. The third portion 170 further includes the seal 164 disposed at or near a distal end of the inner string 160 to form a sealing engagement between the outer and inner strings 150, 160. In one or more embodiments, the annulus 114 above the seal 164 includes an insulating fluid disposed therein. The deviated section 138 of the second portion 130 fluidly couples the first and third portions 120, 170. Here, the deviated section 138 is oriented substantially along the x-y plane. In some other embodiments, the deviated section 138 is oriented out of plane from the x-y plane.

In operation, the fluid 20 is pumped into first portion 120 of the borehole 110 via a first wellhead 30*a*. In some embodiments, pre-heating occurs as the fluid 20 is conveyed down the outer string 150*a*. The fluid 20 enters the deviated section 138 of the second portion 130 at or near the second end 124. The fluid 20 is heated by thermal conduction, convection, and/or radiation from the formation 10 as the fluid 20 is conveyed through the deviated section 138. The heated fluid 22 enters the third portion 170 at or near the second end 174. The heated fluid 22 enters the inner string 160 through the lower end 162 and flows to surface 12 via the inner string 160 and a second wellhead 30*b*. The choke 50 is fluidly coupled to the inner string 160 for regulating return flow of the heated fluid 22 in order to apply backpressure to the well 300A.

Figure 3B:
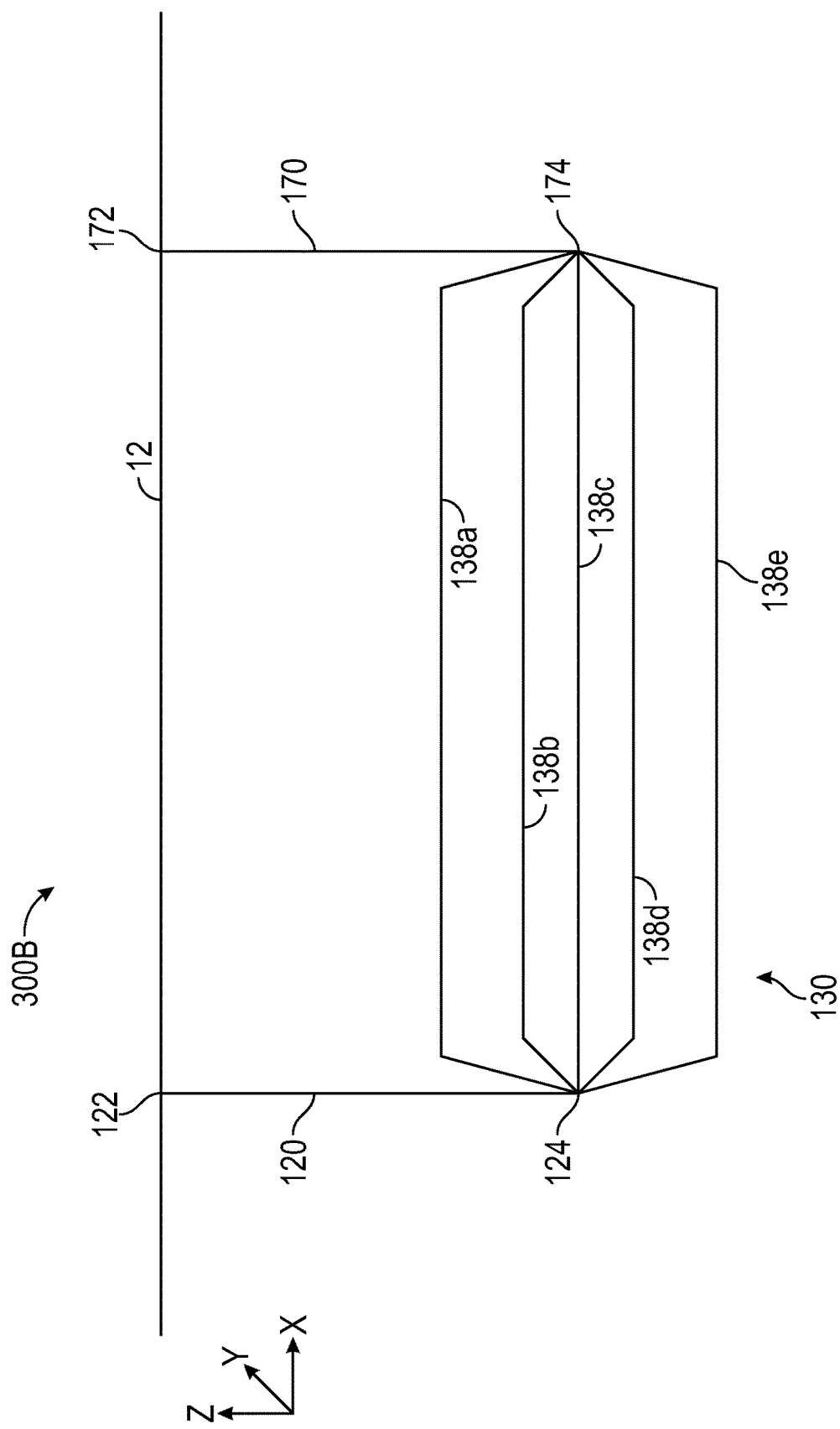
FIG. 3B is a schematic diagram of a U-shaped geothermal well having a plurality of deviated sections, according to one or more embodiments of the present disclosure.

FIG. 3B is a schematic diagram of another exemplary U-shaped well 300B having a plurality of deviated sections 138*a-e*. The well 300B is similar to the well 300A unless otherwise noted. In this example, the second portion 130 of the well 300B includes five different deviated sections 138*a-e*. In some other embodiments, the second portion 130 includes two or more deviated sections, such as from two to ten deviated sections, such as from two to five deviated sections. Each of the plurality of deviated sections 138*a-e* is in fluid communication with the first and third portions 120, 170 of the well 300B. In some embodiments, each of the plurality of deviated sections 138*a-e* are independently directly coupled to the first portion 120, the third portion 170, or both. In some other embodiments, one or more of the plurality of deviated sections 138*a-e* is indirectly coupled to the first portion 120, the third portion 170, or both. In this example, each of the plurality of deviated sections 138*a-e* is oriented generally along the x-axis. In this example, first and fifth deviated sections 138*a*, 138*e* are spaced vertically above and below, respectively, a central deviated section 138*c* which forms a direct line between respective second ends 124, 174 of each of the first and third portions 120, 170. In this example, second and fourth deviated sections 138*b*, 138*d* are spaced on laterally opposite sides of the central deviated section 138*c*. In some other embodiments, one or more of the plurality of deviated sections 138*a-e* are oriented off-axis from the x-axis. In some other embodiments, the plurality of deviated sections 138*a-e* can have any orientation relative to a direct line between respective second ends 124, 174, e.g., being spaced along the y-axis, z-axis, or both, relative thereto.

Figure 3C:
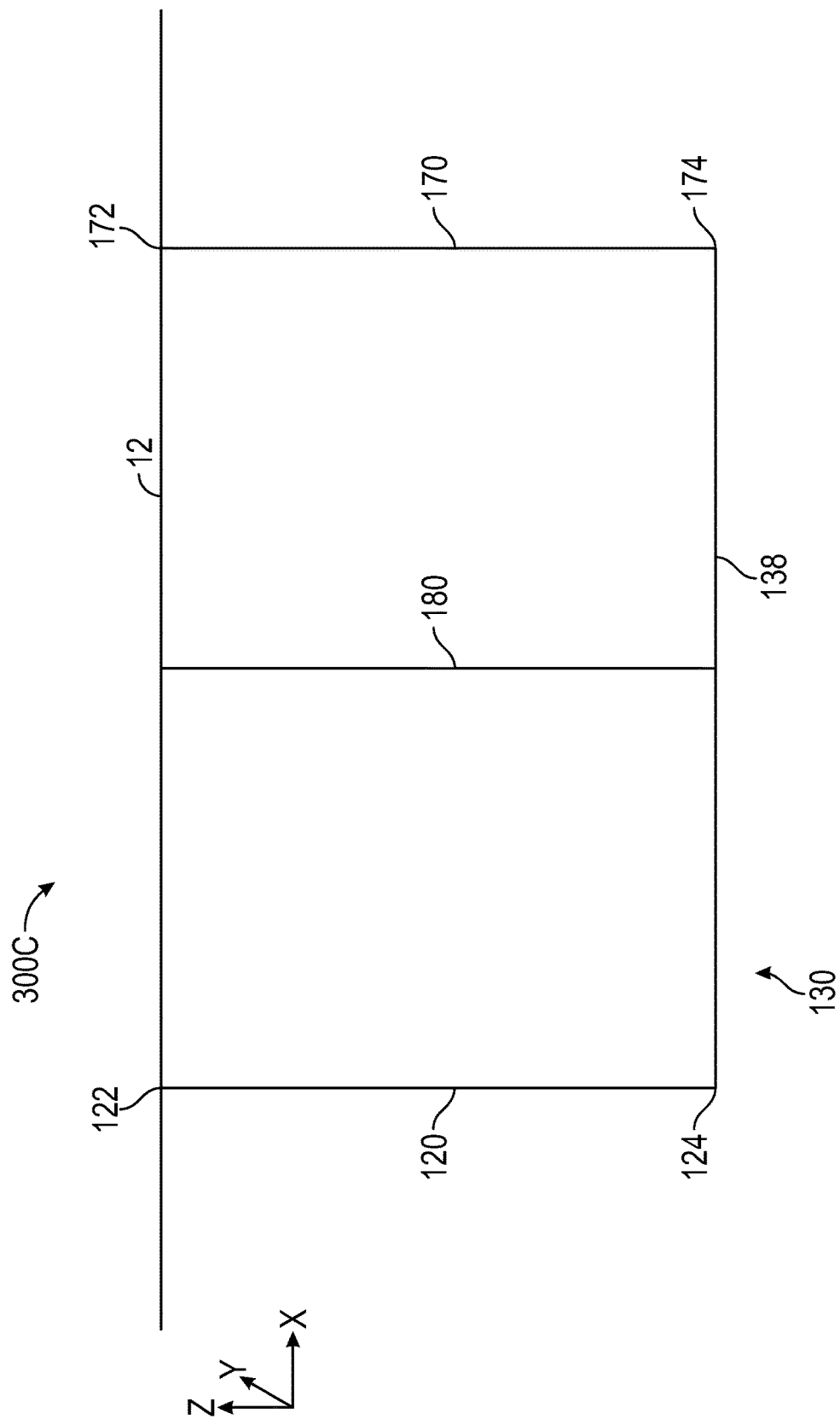
FIG. 3C is a schematic diagram of a U-shaped geothermal well having one input and a plurality of outputs on a single line, according to one or more embodiments of the present disclosure.

FIG. 3C is a schematic diagram of yet another exemplary U-shaped geothermal well 3000 having one input and a plurality of outputs on a single line. The well 3000 is similar to the well 300A unless otherwise noted. In this example, at least one additional output, i.e., fourth portion 180, intersects the deviated section 138 providing a plurality of return flow lines, e.g., two. In some embodiments, return flow rates through each of the plurality of return flow lines are different from each other. In the embodiment illustrated in FIG. 3C, the fourth portion 180 intersects the deviated section 138 of the second portion 130 at about a midpoint thereof. In some other embodiments, the intersection may be located closer to one of the first or third portions 120, 170. In this example, the second portion 130 of the well 3000 includes only a single deviated section 138. However, the well 3000 is not particularly limited to the illustrated embodiment. For example, the embodiments of FIGS. 3B and 3C may be combined without limitation. In other words, the well 3000 can include two or more deviated sections, such as from two to ten deviated sections, such as from two to five deviated sections, where each deviated section has a plurality of outputs.

Figure 3D:
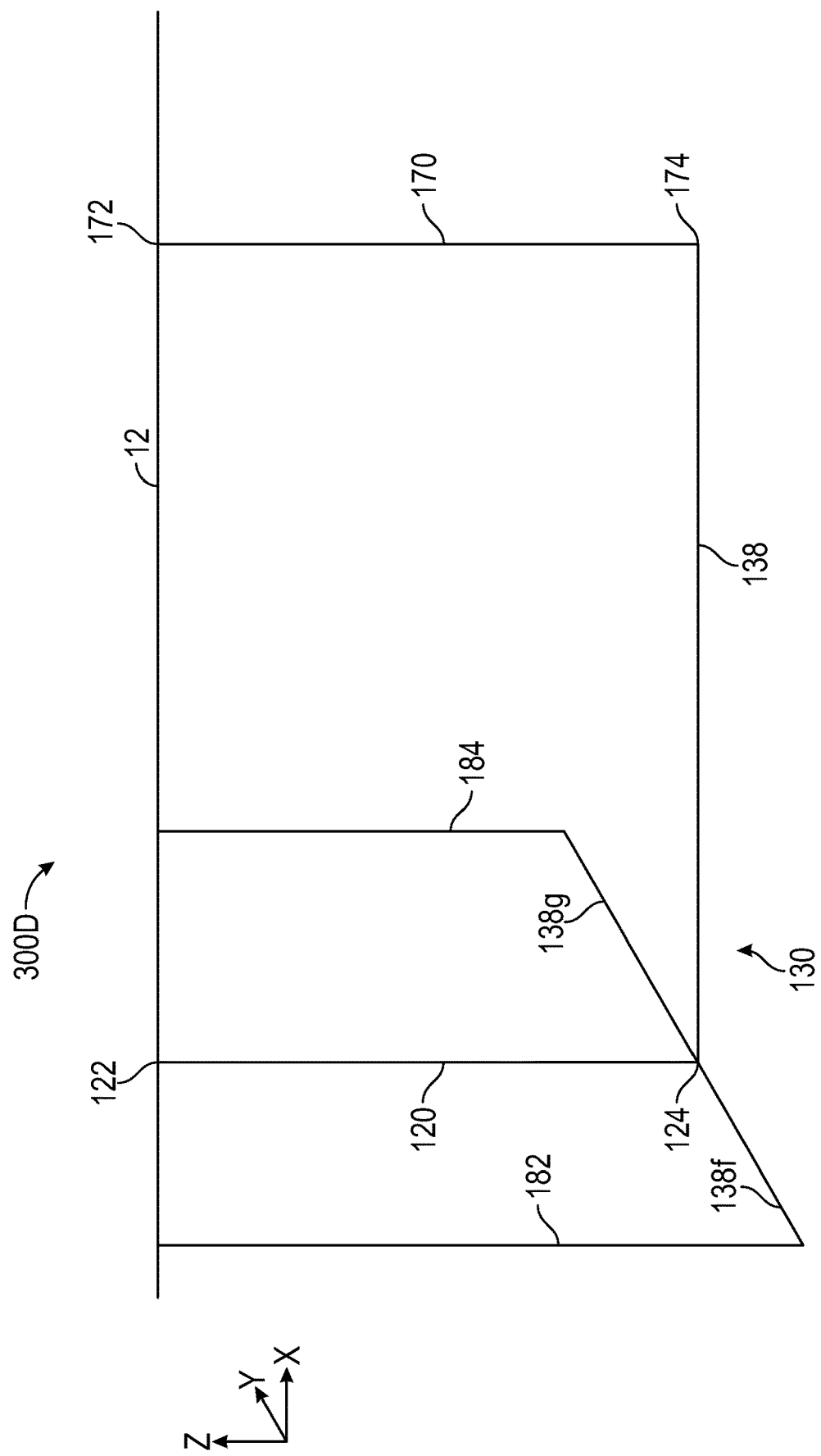
FIG. 3D is a schematic diagram of a U-shaped geothermal well having one input and a plurality of outputs on different lines, according to one or more embodiments of the present disclosure.

FIG. 3D is a schematic diagram of yet another exemplary U-shaped geothermal well 300D having one input and a plurality of outputs on different lines. The well 300D is similar to the well 300A unless otherwise noted. In this example, at least one additional deviated section, i.e., deviated sections 138*f*, 138*g* intersect the first portion 120 at the second end 124. Furthermore, each additional deviated section includes at least one additional output, i.e., portions 182, 184 intersecting the deviated sections 138*f*, 138*g*, respectively, providing a plurality of return flow lines, e.g., three. In some embodiments, return flow rates through each of the plurality of return flow lines are different from each other. In some other embodiments, return flow rates through each of the plurality of return flow lines are about equal to each other. In the embodiment illustrated in FIG. 3D, the deviated sections 138*f*, 138*g* are oriented orthogonally to the deviated section 138. In some other embodiments, each of the plurality of deviated sections may intersect the first portion 120 at any drillable angle. In certain embodiments, aspects of FIGS. 3B-3D may be combined without limitation.

Figure 4:
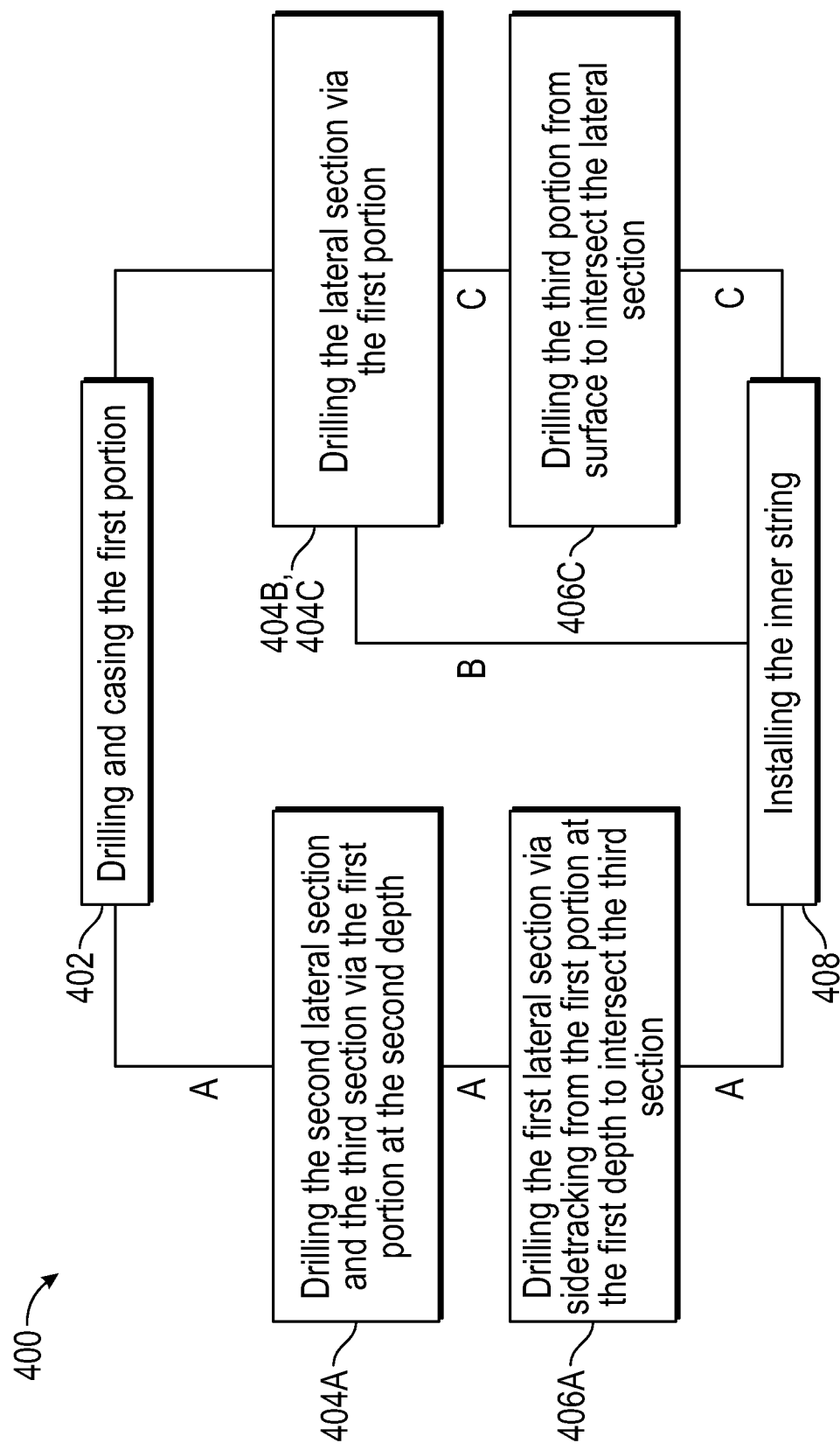
FIG. 4 is a diagram illustrating a method of drilling a geothermal well, according to one or more embodiments of the present disclosure.

FIG. 4 is a diagram illustrating a method 400 of drilling the geothermal wells described herein. It will be appreciated that the operations of the method 400 may be carried out in a different order than is illustrated, certain operations may be omitted, and additional operations may be added, without limitation. At operation 402, the first portion 120 is drilled and at least a section of the first portion 120 is cased. Referring to FIGS. 1A and 1B, at operation 404A, the second deviated section 134 and third section 136 are drilled via the first portion 120 at the second depth d2. Alternatively, referring to FIGS. 2A, 2B, and 3, at operation 404B, 404C, the deviated section 138 is drilled via the first portion 120. Referring to FIGS. 1A and 1B, at operation 406A, the first deviated section 132 is drilled via sidetracking from the first portion 120 at the first depth d1 to intersect the third section 136. In some other embodiments, the third section 136 is drilled via the first deviated section 132 instead of being drilled via the second deviated section 134. Referring to FIG. 3A, at operation 406C, the third portion 170 is drilled from surface 12 to intersect the deviated section 138. At operation 408, the inner string 160 is installed. Referring to FIG. 1B, the inner string 160 is installed into the first deviated section 132 via a multi-lateral junction with the first portion 120.

Figure 5:
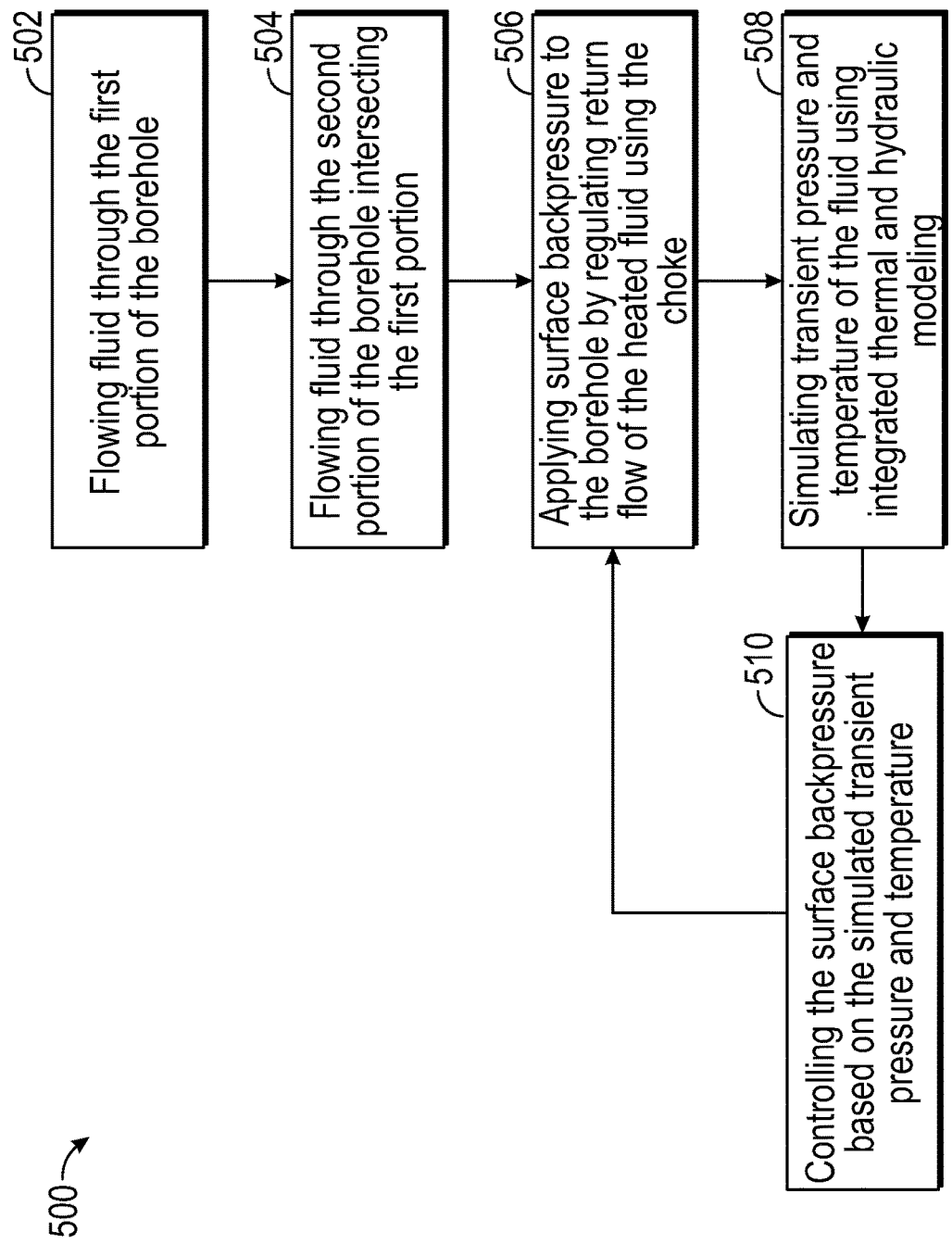
FIG. 5 is a diagram illustrating a method of operating a geothermal well, according to one or more embodiments of the present disclosure.

FIG. 5 is a diagram illustrating a method 500 of operating the geothermal wells described herein. At operation 502, the fluid 20 is flowed through the first portion 120 of the borehole 110 formed in the geologic formation 10. At operation 504, the fluid 20 is flowed through the second portion 130 of the borehole 110 intersecting the first portion 120, where the second portion 130 is exposed to the formation 10 for heating the fluid 20 flowing in the second portion 130. At operation 506, surface backpressure is applied to the borehole 110 by regulating return flow of the heated fluid 22 using the choke 50, the choke 50 being fluidly coupled to at least one of the annulus 114 or the inner string 160. In some embodiments, the surface backpressure is maintained above a boiling pressure of the heated fluid 22 at surface 12. In some embodiments, a difference between the surface backpressure and the boiling pressure of the heated fluid 22 at surface 12 is about 1 MPa or greater. At operation 508, transient pressure and temperature of the fluid 20 is calculated using integrated thermal and hydraulic modeling. At operation 510, the surface backpressure is controlled based on the calculated transient pressure and temperature.

In some embodiments, the modeling includes solving conservation equations for mass, momentum, and energy using a semi-implicit discretization technique. In some embodiments, the semi-implicit discretization technique includes discretizing the borehole 110 axially. In some embodiments, the modeling includes using a thermal resistance network to calculate heat transfer within the formation 10 and between the borehole 110 and the formation 10. In some embodiments, the modeling includes discretizing the formation into a plurality of radial cells at a first depth, where a maximum distance between an outermost cell of the plurality of radial cells and the borehole is updated automatically. In some embodiments, the maximum distance corresponds to a first cell of the plurality of radial cells having a temperature change below a threshold value compared to an adjacent cell located proximate the first cell. In some embodiments, the modeling includes calculating pressure wave dynamics of the fluid, and the surface backpressure is controlled based on the calculated pressure wave dynamics. In some embodiments, the modeling includes calculating at least one of temperature-dependent properties of the fluid, pressure-dependent properties of the fluid, unknown borehole trajectories, borehole discontinuities, vacuum insulated tubing, thermal insulation, or formation temperature changes. In some embodiments, the modeling includes calculating at least one of a pressure or temperature dependency of at least one of density, viscosity, specific heat capacity, or thermal conductivity of the fluid using a plurality of sub-models.

The geothermal wells described herein have the following advantages compared to EGS wells: preventing induced seismicity from avoiding hydraulic fracturing operations, reducing emission of $H_2S$ and $CO_2$ to air from closed loop design, reducing mineral scaling from closed loop design, having a smaller footprint during the construction phase due to the absence of a hydraulic fracturing operation, preventing water source contamination from closed loop design, reducing water consumption from closed loop design, improving controllability to meet the dynamic power demand, reducing operational cost of water cleaning and recycling from closed loop design, or combinations thereof.

In one embodiment, a geothermal well includes a borehole formed in a geologic formation, the borehole including a first portion extending from a first end to a second end and a second portion intersecting the first portion at a first depth, where the second portion is exposed to the formation for heating a fluid flowing in the second portion. The geothermal well includes an outer string disposed in the first portion, a lower end of the outer string being disposed above the first depth. The geothermal well includes an inner string disposed through the outer string and an annulus formed between the inner string and the outer string. The geothermal well includes a choke fluidly coupled to at least one of the annulus or the inner string, where the choke is configured to regulate return flow of the heated fluid to maintain surface backpressure above a boiling pressure of the heated fluid at surface.

In one or more embodiments described herein, the second portion includes an open-hole configured to allow direct contact between the fluid and the formation as the fluid flows through the second portion.

In one or more embodiments described herein, the open-hole is at least partially coated with a material configured to disrupt hydraulic, diffusive and osmotic transport from the borehole to the formation and vice versa.

In one or more embodiments described herein, the second portion intersects the first portion at a second depth greater than the first depth, the first depth is between the first and second ends of the first portion, and the second depth is between the first depth and the second end of the first portion.

In one or more embodiments described herein, the second portion includes a first deviated section intersecting the first portion at the first depth, a second deviated section intersecting the first portion at the second depth, and a third section fluidly coupling the first and second deviated sections.

In one or more embodiments described herein a lower end of the inner string is disposed below the first depth, and the inner string is configured for conventional circulation.

In one or more embodiments described herein, the inner string is continuous with the second portion at the first depth, at least a portion of the inner string includes vacuum insulated tubing, and the inner string is configured for reverse circulation.

In one or more embodiments described herein, a first diameter of the first portion is less than a second diameter of the second portion, and the second portion is at least partially enlarged by applying a destabilizing pressure less than fracture pressure.

In one or more embodiments described herein, the well includes a thermal insulation disposed between the outer string and the formation, the thermal insulation is configured to reduce heat loss from the heated fluid flowing through the annulus, and the thermal insulation includes at least one of insulated casing or insulated cement.

In another embodiment, a method of drilling a geothermal well includes drilling a first portion of a borehole in a geologic formation and drilling a second portion of the borehole where the second portion is exposed to the formation for heating a fluid flowing in the second portion. The drilling of the second portion includes drilling a first deviated section intersecting the first portion at a first depth and drilling a second deviated section intersecting the first portion at a second depth greater than the first depth. The method includes installing an inner string in the first portion.

In one or more embodiments described herein, drilling the second portion of the borehole includes drilling a third section via at least one of the first or second deviated sections, the third section fluidly coupling the first and second deviated sections.

In one or more embodiments described herein, the second portion includes an open-hole configured to allow direct contact between the fluid and the formation as the fluid flows through the second portion.

In one or more embodiments described herein, the method includes coating the open-hole with a material configured to disrupt hydraulic, diffusive and osmotic transport between the borehole and the formation.

In one or more embodiments described herein, the method includes at least partially enlarging the second portion by applying surface backpressure to destabilize the second portion, the surface backpressure being less than fracture pressure, and a first diameter of the first portion is less than a second diameter of the second portion after the enlarging of the second portion.

In another embodiment, a method of operating a geothermal well includes flowing a fluid through a first portion of a borehole formed in a geologic formation, where the first portion includes an inner string, an outer string, and an annulus formed between the inner and outer strings. The method includes flowing the fluid through a second portion of the borehole intersecting the first portion, where the second portion is exposed to the formation for heating the fluid flowing in the second portion. The method includes applying a surface backpressure to the borehole by regulating return flow of the heated fluid using a choke, the choke being fluidly coupled to at least one of the annulus or the inner string, where the surface backpressure is maintained above a boiling pressure of the heated fluid at surface.

In one or more embodiments described herein, the second portion includes a first deviated section intersecting the first portion at a first depth, a second deviated section intersecting the first portion at a second depth greater than the first depth, and a third section fluidly coupling the first and second deviated sections.

In one or more embodiments described herein, the well is configured for conventional circulation, the surface backpressure is applied to the annulus, and flowing the fluid through the first and second portions sequentially includes flowing the fluid down through inner string, flowing the fluid through the second deviated section, the third section, and the first deviated section, and flowing the heated fluid up through the annulus, wherein a thermal insulation is disposed between the outer string and the formation for reducing heat loss from the heated fluid flowing through the annulus.

In one or more embodiments described herein, the well is configured for reverse circulation, the surface backpressure is applied to the inner string, the inner string is continuous with the second portion at the first depth, and flowing the fluid through the first and second portions sequentially includes flowing the fluid down through the annulus, flowing the fluid through the second deviated section, the third section, and the first deviated section, and flowing the fluid up through the inner string, wherein the inner string includes thermal insulation for reducing heat loss from the heated fluid flowing through the inner string.

In one or more embodiments described herein, the borehole includes a third portion extending from surface to intersect the second portion, and the method includes injecting the fluid through the third portion.

In one or more embodiments described herein, a difference between the surface backpressure and the boiling pressure of the heated fluid at surface is about 1 MPa or greater.

In one or more embodiments described herein, the method includes calculating transient pressure and temperature of the fluid using integrated thermal and hydraulic modeling, and the surface backpressure is controlled based on the calculated transient pressure and temperature.

In one or more embodiments described herein, the modeling includes solving conservation equations for mass, momentum, and energy using a semi-implicit discretization technique.

In one or more embodiments described herein, the semi-implicit discretization technique includes discretizing the borehole axially.

In one or more embodiments described herein, the modeling includes using a thermal resistance network to calculate heat transfer within the formation and between the borehole and the formation.

In one or more embodiments described herein, the modeling includes discretizing the formation into a plurality of radial cells at a first depth, a maximum distance between an outermost cell of the plurality of radial cells and the borehole is updated automatically, and the maximum distance corresponds to a first cell of the plurality of radial cells having a temperature change below a threshold value compared to an adjacent cell located proximate the first cell.

In one or more embodiments described herein, the modeling includes calculating pressure wave dynamics of the fluid, and the surface backpressure is controlled based on the calculated pressure wave dynamics.

In one or more embodiments described herein, the modeling includes calculating at least one of temperature-dependent properties of the fluid, pressure-dependent properties of the fluid, unknown borehole trajectories, borehole discontinuities, vacuum insulated tubing, thermal insulation, or formation temperature changes.

In one or more embodiments described herein, the modeling includes calculating at least one of a pressure or temperature dependency of at least one of density, viscosity, specific heat capacity, or thermal conductivity of the fluid using a plurality of sub-models.

While the foregoing is directed to embodiments of the present disclosure, other and further embodiments may be devised without departing from the basic scope thereof, and the scope of the present disclosure is determined by the claims that follow.

The invention claimed is:
1. A geothermal well comprising:
a borehole formed in a geologic formation, the borehole including:
  a first portion extending from a first end to a second end; and
  a second portion intersecting the first portion at a first depth, wherein the second portion is exposed to the formation for heating a fluid flowing in the second portion;
an outer string disposed in the first portion, a lower end of the outer string being disposed above the first depth;
an inner string disposed through the outer string;
an annulus formed between the inner string and the outer string; and
a choke fluidly coupled to at least one of the annulus or the inner string, wherein the choke is configured to regulate return flow of the heated fluid to maintain surface backpressure above a boiling pressure of the heated fluid at surface.

2. The well of claim 1, wherein the second portion comprises an open-hole configured to allow direct contact between the fluid and the formation as the fluid flows through the second portion.

3. The well of claim 2, wherein the open-hole is at least partially coated with a material configured to disrupt hydraulic, diffusive and osmotic transport from the borehole to the formation and vice versa.

4. The well of claim 1, wherein the second portion further intersects the first portion at a second depth greater than the first depth, wherein the first depth is between the first and second ends of the first portion, and wherein the second depth is between the first depth and the second end of the first portion.

5. The well of claim 4, wherein the second portion comprises:
   a first deviated section intersecting the first portion at the first depth;
   a second deviated section intersecting the first portion at the second depth; and
   a third section fluidly coupling the first and second deviated sections.

6. The well of claim 4, wherein a lower end of the inner string is disposed below the first depth, and wherein the inner string is configured for conventional circulation.

7. The well of claim 4, wherein the inner string is continuous with the second portion at the first depth, wherein at least a portion of the inner string comprises vacuum insulated tubing, and wherein the inner string is configured for reverse circulation.

8. The well of claim 1, wherein a first diameter of the first portion is less than a second diameter of the second portion, the second portion being at least partially enlarged by applying a destabilizing pressure less than fracture pressure.

9. The well of claim 1, further comprising a thermal insulation disposed between the outer string and the formation, wherein the thermal insulation is configured to reduce heat loss from the heated fluid flowing through the annulus, and wherein the thermal insulation comprises at least one of insulated casing or insulated cement.

10. A method of drilling a geothermal well, the method comprising:
   drilling a first portion of a borehole in a geologic formation;
   drilling a second portion of the borehole, wherein the second portion is exposed to the formation for heating a fluid flowing in the second portion, and wherein the drilling of the second portion comprises:
      drilling a first deviated section intersecting the first portion at a first depth; and
      drilling a second deviated section intersecting the first portion at a second depth greater than the first depth;
   installing an inner string in the first portion; and
   applying a surface backpressure to the borehole that is less than a fracture pressure.

11. The method of claim 10, wherein drilling the second portion of the borehole further comprises drilling a third section via at least one of the first or second deviated sections, the third section fluidly coupling the first and second deviated sections.

12. The well of claim 10, wherein the second portion comprises an open-hole configured to allow direct contact between the fluid and the formation as the fluid flows through the second portion.

13. The method of claim 12, further comprising coating the open-hole with a material configured to disrupt hydraulic, diffusive and osmotic transport between the borehole and the formation.

14. The method of claim 10, further comprising at least partially enlarging the second portion using the surface backpressure to destabilize the second portion, wherein a first diameter of the first portion is less than a second diameter of the second portion after the enlarging of the second portion.

15. A method of operating a geothermal well, the method comprising:
   flowing a fluid through a first portion of a borehole formed in a geologic formation, wherein the first portion includes an inner string, an outer string, and an annulus formed between the inner and outer strings;
   flowing the fluid through a second portion of the borehole intersecting the first portion, wherein the second portion is exposed to the formation for heating the fluid flowing in the second portion; and
   applying a surface backpressure to the borehole by regulating return flow of the heated fluid using a choke, the choke being fluidly coupled to at least one of the annulus or the inner string, wherein the surface backpressure is maintained above a boiling pressure of the heated fluid at surface.

16. The method of claim 15, wherein the second portion comprises:
   a first deviated section intersecting the first portion at a first depth;
   a second deviated section intersecting the first portion at a second depth greater than the first depth; and
   a third section fluidly coupling the first and second deviated sections.

17. The method of claim 16, wherein the well is configured for conventional circulation, wherein the surface backpressure is applied to the annulus, and wherein flowing the fluid through the first and second portions sequentially comprises:
   flowing the fluid down through inner string;
   flowing the fluid through the second deviated section, the third section, and the first deviated section; and
   flowing the heated fluid up through the annulus, wherein a thermal insulation is disposed between the outer string and the formation for reducing heat loss from the heated fluid flowing through the annulus.

18. The method of claim 16, wherein the well is configured for reverse circulation, wherein the surface backpressure is applied to the inner string, wherein the inner string is continuous with the second portion at the first depth, and wherein flowing the fluid through the first and second portions sequentially comprises:
   flowing the fluid down through the annulus;
   flowing the fluid through the second deviated section, the third section, and the first deviated section; and
   flowing the fluid up through the inner string, wherein the inner string includes thermal insulation for reducing heat loss from the heated fluid flowing through the inner string.

19. The method of claim 15, wherein the borehole further comprises a third portion extending from surface to intersect the second portion, further comprising injecting the fluid through the third portion.

20. The method of claim 15, wherein a difference between the surface backpressure and the boiling pressure of the heated fluid at surface is about 1 MPa or greater.

* * * * *